April 28, 1959 E. V. BERGSTROM 2,884,372
SPHERICAL REACTOR FOR THE CONVERSION OF HYDROCARBONS
Filed May 29, 1956 3 Sheets-Sheet 2

INVENTOR
Eric V. Bergstrom
BY
AGENT

April 28, 1959  E. V. BERGSTROM  2,884,372
SPHERICAL REACTOR FOR THE CONVERSION OF HYDROCARBONS
Filed May 29, 1956  3 Sheets-Sheet 3
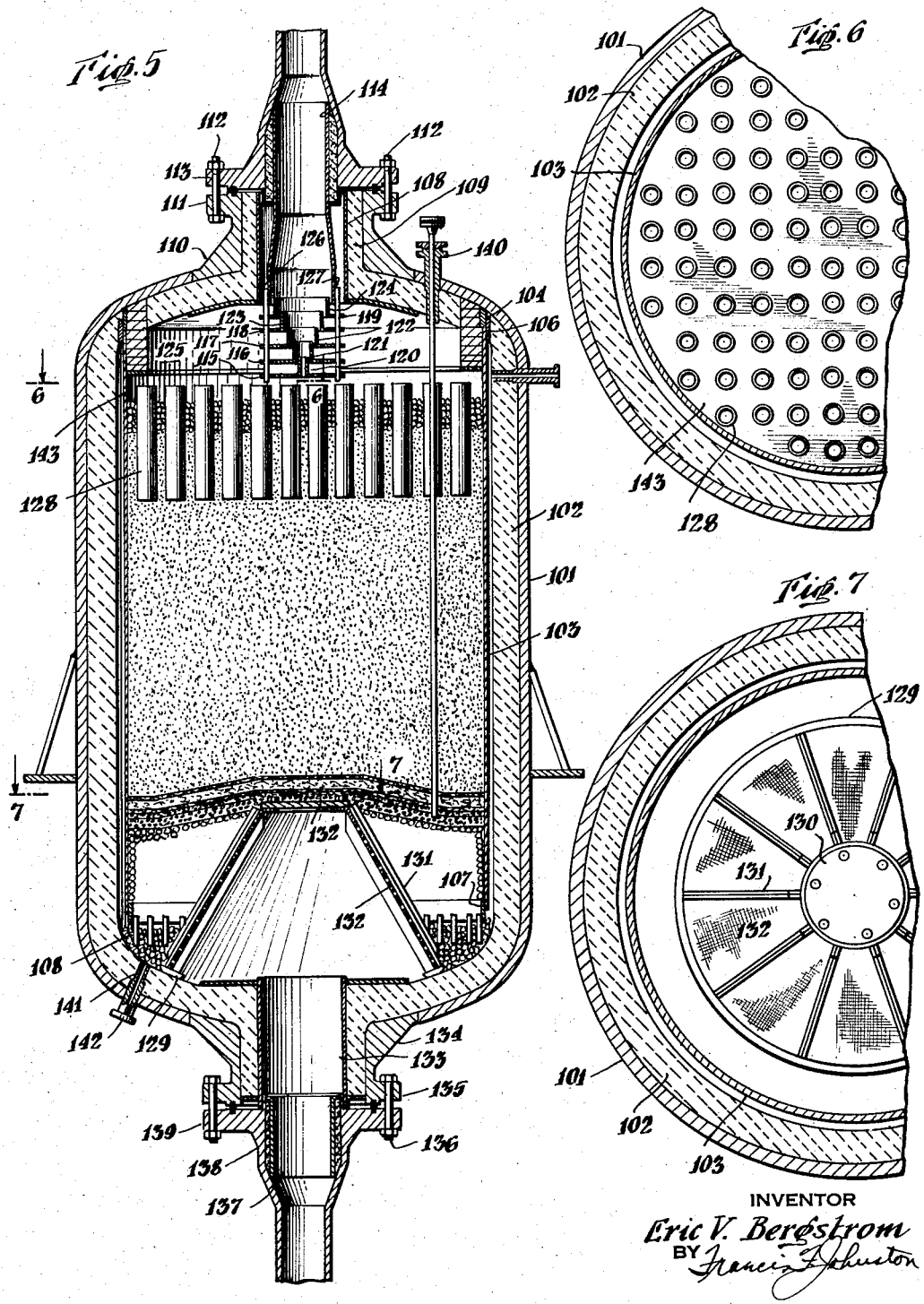
INVENTOR
Eric V. Bergstrom
BY
AGENT

United States Patent Office 2,884,372
Patented Apr. 28, 1959

2,884,372

SPHERICAL REACTOR FOR THE CONVERSION OF HYDROCARBONS

Eric V. Bergstrom, Short Hills, N.J., assignor to Socony Mobil Oil Company, Inc., a corporation of New York Application May 29, 1956, Serial No. 588,135

17 Claims. (Cl. 208—113)

The present invention relates to hydrocarbon conversion wherein a gas is recycled which recycle gas has entrained metallic and/or metalloid particles of large width (3 inches) as well as particles in the size range of dust, i.e., minus 250 mesh and, more particularly, to hydrocarbon conversion in the presence of hydrogen-containing recycle gas containing hydrogen sulfide which gas during the recycle entrains metallic and/or metalloid particles of scale range from the size of dust, i.e., minus 250 mesh to particles 3 inches or more in width.

During the reforming of hydrocarbon mixtures containing sulfur it has been found that, although in many instances the hydrogen sulfide produced in the reforming reaction only amounts to about 0.04 volume percent of the recycle gas, nevertheless scale is formed in sufficient quantity to be deposited on the top of the catalyst bed and to infiltrate the upper portion of the catalyst bed to a depth of about 18 inches. Although the scale had formed a crust about one-half inch thick on the surface of the bed of catalyst, it was found that the increased pressure drop was due primarily to the sifting of the dust-like particles of the scale into the catalyst bed. The accumulation of scale in the catalyst bed can increase the pressure drop to a level about four times normal in a few days although the crust formed of large pores on the upper surface of the catalyst bed be only about one-half inch thick.

It has been customary for many years to use vertical cylindrical tanks of sufficient wall thickness to withstand the pressure to which the tank is subjected for hydrocarbon conversions at temperatures above 800° F. and pressures about 300 p.s.i. Although these cylindrical tanks are insulated so that the outside wall temperature under normal conditions is of the order of 300° to 350° F. it has been found that with a cold wind blowing or in a rainstorm the windward portion of the tank shell will have an outside wall temperature as much as 200° to 250° F. below the outside wall temperature of the leeward portion of the tank. Such a difference in temperature between the windward portion of the tank and the leeward portion of the tank causes stress as much as 40,000 p.s.i. to be created. In a cylindrical tank compensation for this stress can only be had in the heads or ends of the cylindrical tank with deformation of the head of the tank. As design pressure increases the wall and head thicknesses become greater. The end thrust on the cylindrical tank heads due to thermal expansion differences becomes greater while the thicker heads become less able to flex with the result that bending stresses in the heads become excessive.

The present invention provides a solution to both of the problems briefly outlined hereinbefore. Accordingly, the present invention provides a solution to the problem of rapid build-up of intolerable pressure drop through a catalyst bed by providing an area of contact between the catalyst bed and the incoming recycle gas carrying the scale of at least about 3 to about 5 times the cross-section of the bed.

The solution to the excessive stresses generated in the heads of the cylindrical reactor likewise is provided by the present invention by employing a spherical reactor which is capable of absorbing the deformation of the metal due to the difference in temperature of the windward and leeward sides throughout the sphere rather than in a localized area only. This makes possible the use of a spherical shell about two-thirds as thick as the cylindrical shell required for the same working pressure.

The present invention also provides a novel method of suspending the inner corrosion resistant metallic shell within either a cylindrical or a spherical reactor with a novel sliding catalyst-tight joint at the free end of the shell.

The advantages of the present invention will become apparent from the following description of the invention taken in conjunction with the drawings in which Figure 1 is a vertical cross-section of a spherical reactor for hydrocarbon conversions;

Figure 5 is a vertical cross-section of a horizontal reactor showing novel baffling means in the reactor vapor inlet and novel vapor distributing means adapted to increase the period during which reactor back pressure increases due to infiltration of the upper part of the catalyst bed with fine metallic or metalloid particles;

Figure 6 is a horizontal cross-section of the cylindrical reactor taken at line 6—6 of Figure 5 showing one arrangement of the vapor distributing means shown in Figure 5;

Figure 7 is a horizontal cross-section of the cylindrical reactor taken at line 7—7 of Figure 5; and Figure 8 is a detail drawing of the method of hanging the inner corrosion resistant metallic reactor liner from the roof of the cylindrical reactor shown in Figure 5.

Figure 1:
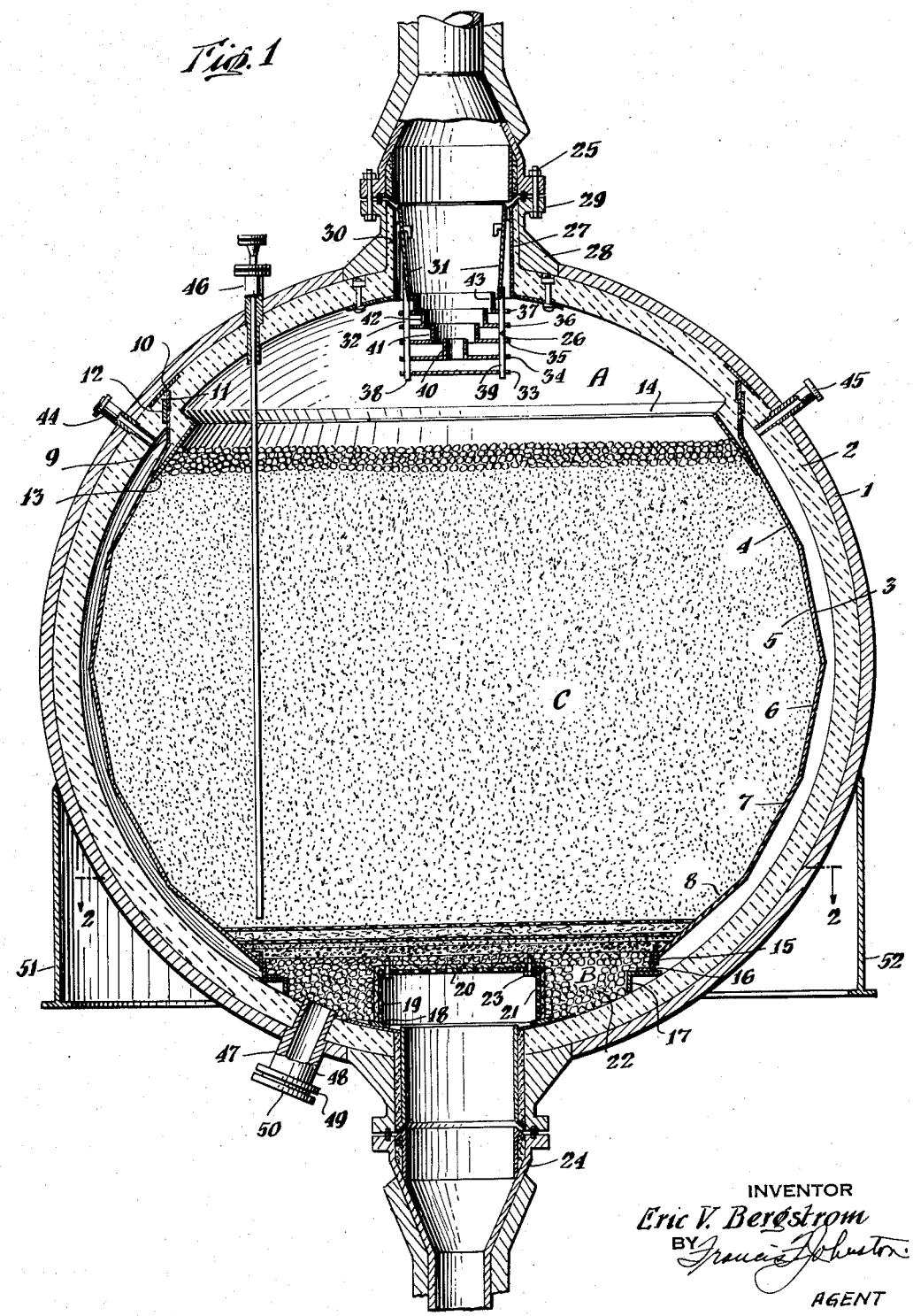

Referring to Figure 1. The spherical reactor shown in Figure 1 can be used for hydrocarbon conversions such as hydrogenation, reforming, desulfurization, hydrocracking and, in general, all reactions which take place at elevated temperatures and super-atmospheric pressures. For example, in hydrogenation of hydrocarbon mixtures pressures of the order of 500 to 2000 p.s.i. are employed with temperatures of 300° F. to 800° F. dependent upon the catalyst and degree of hydrogenation required. Desulfurization which is a particular type of hydrogenation is usually achieved at pressures of the order of 500 p.s.i. and temperatures of the order of 600° to 800° F. Reforming is accomplished at pressures of 200 to 750 p.s.i. and temperatures of the order of 800° to 1000° F. Hydrocracking requires the use of pressures of the order 500 to 1500 p.s.i. and temperatures of the order of 800° to 1000° F. Since the cost of erection of a spherical reactor and a cylindrical reactor of the same capacity are about equal, the spherical reactor can also be used for conversions at lower pressures and temperatures with many advantages but its outstanding advantages are recognized most readily for conversions occurring at elevated temperature and reaction pressures in excess of 200 p.s.i.

For simplicity of illustration the spherical reactor has been shown without the novel vapor distributing means whereby the period during which intolerable back pressure is built up is lengthened measurably. Nevertheless, it is to be understood that vapor distributing means whereby the area of contact between vapors carrying solid particles ranging in size from minus 250 mesh to 3 inches in width and a catalyst bed is at least 3 to 5 times the cross-sectional area of the catalyst bed can be used in conjunction with the spherical reactor of the present invention.

Figure 2:
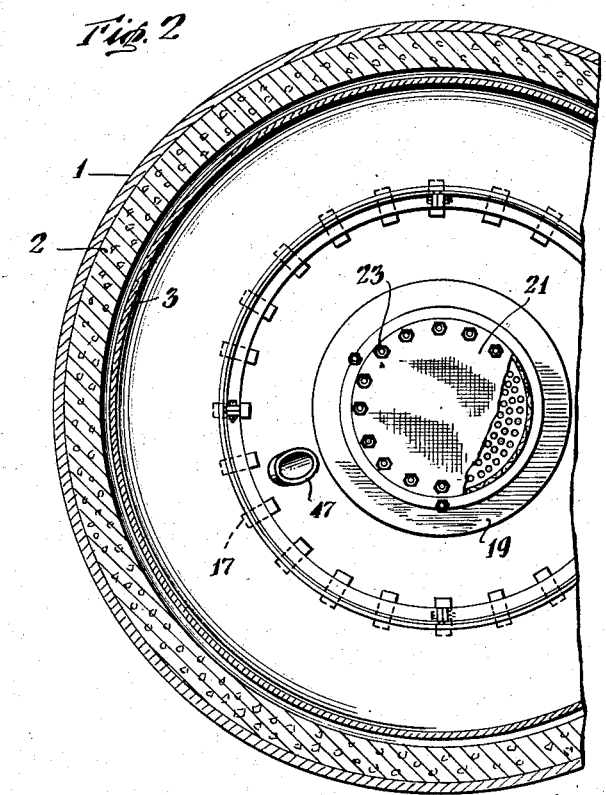
Figure 2 is a horizontal cross-section of the spherical reactor for hydrocarbon conversions shown in Figure 1 taken at line 2—2.
Figure 3:
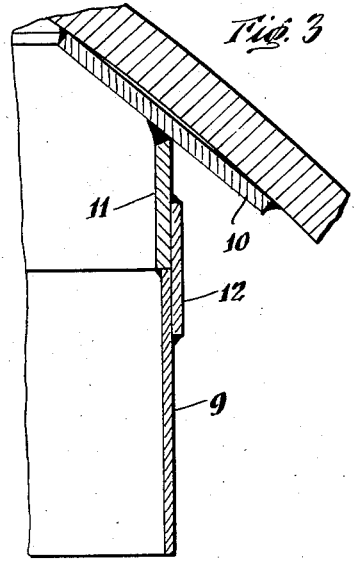
Figure 3 is a detail drawing of the method of hanging the inner corrosion resistant metallic reactor liner from the roof of the spherical reactor shown in Figure 1.
Figure 4:
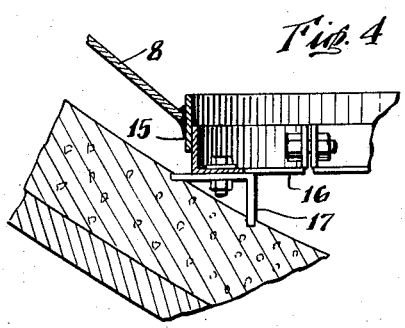
Figure 4 is a detail drawing of the sliding catalyst-tight expansion joint between the inner corrosion resistant metallic reactor liner shown in Figure 1.
Figure 9:
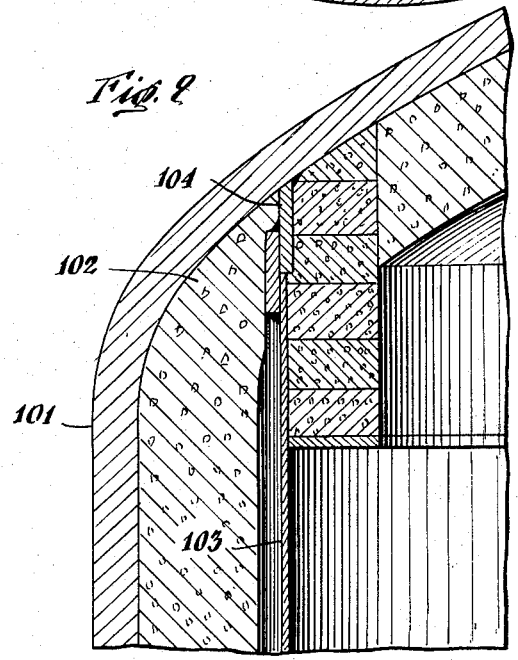

A spherical reactor as shown in Figure 1 with enlarged details of certain features shown in Figures 2, 3 and 4 comprises a shell 1 of structural strength about two-thirds the thickness of the structural shell required for a cylindrical reactor operating at the same pressure and temperature. Within the shell there is a layer 2 of insulation, for example, firebrick or preferably insulating concrete. Within the insulating layer 2 is a corrosion resistant metallic liner 3 spaced apart from the layer of insulation to provide a gas space within which a gas at reactor pressure is maintained.

In the spherical reactor the corrosion resistant metallic liner is only required in that area of the shell within which the bed of catalyst is placed. The corrosion resistant liner comprises a plurality of sections of a cone 4, 5, 6, 7 and 8 welded at the edges to each other and suspended from the roof of the reactor by means of annulus 9 welded to conical section 4 and to conical plate 10. When desired annulus 9 can be butt welded to a second annulus 11 and the joint backed with a third annulus 12 as shown in Figure 1. However, it is preferred to use a single annulus 9 welded along one edge to liner section 4 and along the other edge to conical plate 10. An insulation cone 13 is welded along the greater periphery to the inner surface of liner section 4 along the other edge to an inverted cone 14 which in turn is secured in any suitable manner to the structural shell of the reactor.

The lowermost liner section 8 is secured in any suitable manner as by welding to a vertical annular plate 15 which makes a sliding catalyst-tight joint with angle ring 16. Angle ring 16 is supported in any suitable manner as by circular angle 17. Compensation for the expansion and contraction of the corrosion resistant liner is provided by the rising or the lowering of annular plate 15.

The spherical reactor is provided with a catalyst support or grid 18 comprising a basket of structural metal of any suitable design as for example the cylinder shown in Figure 1 or the cone shown in Figure 5.

The cylinder shown in Figure 1 comprises a perforated cylinder 19, a foraminous plate 20 and a screen 21, all having orifices small enough to retain the balls of inert material 22. The cylinder 19 is secured to the shell 1 of the reactor in any suitable manner. The screen 21 and the foraminous plate 20 are secured to the cylinder 19 in any suitable maner as by bolts 23 and others not shown.

The spherical reactor is provided with a suitable vapor outlet 24 preferably at the vertical center line of the sphere beneath the catalyst support.

The spherical reactor is also provided with a suitable vapor inlet 25 preferably adapted for the suspension of the novel vapor baffling means 26. Accordingly, the preferred vapor inlet comprises a cylindrical section 27, a shoulder 28 provided with a flange 29. Between the cylindrical section 27 and the shoulder 28 is insulation 30. Mounted in any suitable manner within the vapor inet are stays 31 from which is suspended in any suitable manner baffling means 32.

Means to baffle the flow of vapor into the reactor is of considerable importance. For example, the incoming unbaffled vapors can scour a crater in the catalyst bed to a depth of about one-third the total depth of the catalyst bed. This is not surprising since the vapors are travelling at almost a mile per minute, i.e., at 80 feet per second. The baffling means 26 comprises a plurality of disks, say 3 or more, preferably 4 or more, vertically arranged in any suitable manner beneath the cylindrical section 27 of the vapor inlet and preferably concentric therewith. Thus, for example, plates 33, 34, 35, 36 and 37 are mounted on a plurality of rods 38 and 39 at distances dependent upon the height of the central collars 40, 41, 42 and 43. Disks 33, 34, 35 and 36 have diameters substantially equal to the inside diameter of cylindrical section 27. The central collar 43 has a height sufficiently greater than the distance between disk 37 and the lower end of cylindrical section 27 that the upper edge of collar 43 is within cylindrical section 27. Collar 43 has a diameter about 70 to about 80 percent of the inside diameter of cylindrical section 27. Collar 42 has a diameter about 70 to about 80 percent of the inside diameter of collar 43. Collar 41 has an inside diameter about 65 to about 75 percent of the diameter of collar 42. Collar 40 has an inside diameter about 45 to about 55 percent of the diameter of collar 41. Thus, about 49 to about 65 percent, say about 52 percent preferably, of the vapors issuing from vapor inlet 27 pass through collar 43 and the balance flows around collar 43 to be deflected in a horizontal path by plate or disk 37. About 49 to about 65, preferably about 52, percent of the vapors issuing from collar 43 pass through collar 42. About 42 to about 56, preferably about 45, percent of the vapors issuing from collar 42 pass through collar 41 while about 20 to about 30, preferably about 26, percent of the vapors issuing from collar 41 pass through collar 40. Each collar has a height about 20 to 30 percent greater than the distance between the associated plate and the lower edge of cylindrical section 27 or the adjacent higher plate. For example, the distance between plates and between plate 37 and the lower end of cylindrical section 27 can be 3.25 inches and the height of the collars 4 inches. The whole assembly is mounted preferably on the center line of the vapor inlet by securing legs 38 and 39 to step 31 in any suitable manner.

The spherical reactor is also provided with means to purge the gas space between the insulation and the corrosion resistant liner. Preferably, the reactor is provided with a plurality of such purge connections 44 and 45 comprising a pipe of suitable diameter, say one inch, and a suitable closure means, for example, a valve not shown. The spherical reactor is also provided with one or more, preferably 3, thermocouple wells 46 of conventional structure extending to the bottom of the catalyst bed. The spherical reactor is also provided with at least one, preferably 2, catalyst withdrawal conduits 47 of any suitable construction. For example, a large diameter, say 6 inches, nipple 48 having a flange 49 and a cap 50 bolted to the flange 49 provides a suitable catalyst withdrawal means.

It will be observed that the interior operating space of the spherical reactor is divided into 3 zones, an upper plenum chamber A, a lower plenum chamber B and a catalyst chamber or bed C. The depth of the catalyst chamber or bed shall not be more than about 75 percent of the total vessel diameter. The height or depth of the plenum chambers shall not be less than about 12 percent of the total diameter of the vessel. This prevents more than 10 percent difference in the mass velocity of the reactants across the bed and reduces the total difference in pressure through the bed.

It will be observed that the catalyst bed is in the form of a spherical segment of two bases. In accordance with the present invention, the sum of the two bases of the spherical segment occupied by the catalyst bed shall be not less than 87.5 percent of the area of the great circle of the spherical reactor.

Although the spherical reactor is illustrated in Figure 1 without the plurality of vapor distributor cages, it is preferred to provide the spherical reactor with such vapor distributing cages. Accordingly, the total surface of all of the distributing cages shall have an area at least 3 to 5 times the area of the small circle of the at least 3 to 5 times the cross-sectional area of the catalyst bed.

Beneath the catalyst bed is a vapor collecting space devoid of catalyst but preferably filled with particulate inert material. A grid preferably in the form of a truncated cone concentric with the vapor outlet is disposed within the vapor collecting space. Grids of other geometric design such as a cylinder can be employed. The grid illustrated comprises a cone having a base 129, a top 130 and ribs 131. Secured to ribs 131 are sections of screen 132, preferably fabricated from corrosion resistant wire, having openings smaller than the fragments of inert material in contact therewith.

The reactor is provided with a vapor outlet preferably concentric with the catalyst grid having a cylindrical throat 133, a shoulder 134 and a flange 135 provided with holes for the receipt of a plurality of bolts 136. The complementary piping is provided with a cylindrical throat 137 secured to the inner wall of shoulder 138. Shoulder 138 is provided with a flange 139 having a plurality of holes which are aligned with the holes in flange 135 and through which bolts 136 are passed and secured to make a gastight joint between the units.

The reactor is provided with a plurality of thermowells 140 of any suitable construction for receipt of thermocouples. The reactor is provided with at least one catalyst withdrawal means in the bottom thereof. Preferably the catalyst withdrawal means comprises a conduit 141 of suitable diameter and a cap 142.

It is preferred in operation to fill the space between the vapor collecting space with large size fragments of inert material to within about 6 inches of the bottom of the catalyst bed. For example, alumina balls or pebbles ¾ of an inch in diameter can be used. On the top of the large fragments of inert material are placed successive layers of smaller fragments of inert material. For example, a layer 2 inches thick of alumina balls or pebbles ⅜ of an inch in diameter can be placed on the ¾ inch fragments, a layer 1 inch thick of ¼ inch alumina balls or pebbles can be placed on the ⅜ inch balls or pebbles, and a layer 3 inches thick of tabular alumina crushed to pass a screen with ¼ inch openings can be placed upon the ¼ inch alumina balls or pebbles.

The operation of the cylindrical reactor is as follows. Reactor vapors at reaction temperature and pressure enter cylindrical throat 148 and flow therethrough to the reactant vapor distributing means which breaks the stream into a plurality of streams having primarily a horizontal direction of flow. The reactant vapors enter plenum chamber 125 as a plurality of streams. The plenum chamber is defined by the roof and walls of the reactor and perforated plate 143 from which are suspended cages 128 having a surface area at least 3 to 5 times the cross-sectional area of the catalyst bed. The large fragments of scale or the like carried by the reactant vapors will either be retained by plate 143 or will fall to the bottoms of cages 128. The dust-like particles will to some extent infiltrate the catalyst bed through the cages. However, the area of contact being so much greater than the cross-sectional area of the catalyst bed the build-up of back pressure is noticeably retarded. The reactant vapors pass downwardly through the catalyst bed to the vapor collecting space. Thence through the catalyst grid to the vapor outlet. From the vapor outlet the vapors are conducted through heat exchangers, coolers, fractionating towers and other means for separating the product or products from unreacted material and gas for recycle if any.

Thus, in hydrogenation, reforming and hydrocracking the vaporous effluent from either the spherical or the cylindrical reactor flows to heat exchangers and thence to coolers in which the vaporous effluent is cooled to a temperature at which the hydrocarbons are condensed but a portion of the effluent is uncondensed. The uncondensed portion of the effluent is separated from the condensed portion and is recycled to the reactor to supply the hydrogen required for the reaction.

I claim:

1. A method of converting fluid reactant which comprises establishing a reaction zone having an inlet chamber, a vapor collecting chamber, and a bed of granular catalyst interposed between said inlet chamber and said vapor collecting chamber, said bed of granular catalyst being confined and supported in the form of a spherical segment of two bases and having one of said bases contiguous to, substantially parallel with, and substantially co-extensive with said inlet chamber and having the other of said bases contiguous to, substantially parallel with, and substantially co-extensive with said vapor collecting chamber, the total area of the upper and lower surfaces of said bed of granular catalyst being at least about 87.5 percent of the area of the great circle of said spherical segment and the distance between said upper and lower surfaces of said bed of granular catalyst being not more than about 75 percent of the diameter of the great circle of said spherical segment to maintain the difference in the maximum and minimum velocities of reactant across said bed of granular catalyst at not more than about 10 percent, introducing fluid reactant at reaction temperature and pressure into said inlet chamber, passing said fluid reactant from said inlet chamber into and through said bed of granular catalyst at a plurality of mass velocities, the difference between the maximum and minimum of said mass velocities being not more than about 10 percent, passing conversion products from said bed of granular catalyst into said vapor collecting chamber, and withdrawing conversion products from said vapor collecting chamber.

2. The method of claim 16 wherein the major portion of the reactant is introduced into the inlet chamber, as a plurality of streams flowing substantially parallel to the base of said inlet chamber.

3. The method of claim 16 wherein the fluid reactant carries entrained solid particles at least a portion of which pass a 250-mesh screen wherein the fluid reactant enters the catalyst bed through a foraminous distributor embedded in said catalyst bed not more than about one-half the depth of said catalyst bed and having a surface area at least 3 to 5 times the area of the surface of said catalyst bed, and wherein said foraminous distributor is pervious to at least that portion of said entrained solid particles which pass a 250-mesh screen.

4. The method of claim 16 wherein the catalyst-free collecting space is filled with inert material.

5. In the method of hydrocarbon conversion which comprises establishing a static bed of granular catalyst in a reaction zone, introducing fluid reactant into said reaction zone, passing said fluid reactant through said catalyst bed, and withdrawing reaction products from said bed, the improvement which comprises introducing the major portion of said fluid reactant into said reaction zone as a plurality of streams flowing above and substantially parallel to the upper surface of said catalyst bed.

6. In the method of hydrocarbon conversion which comprises establishing a static bed of granular catalyst in a reaction zone, introducing fluid reactant and entrained solid particles at least a portion of which pass a 250-mesh screen into said reaction zone, passing said reactant and entrained particles into said catalyst bed whereby fine particles infiltrate the upper portion of said catalyst bed and rapidly increase the back pressure through said catalyst bed to impractical levels, and withdrawing reaction products from said catalyst bed, the improvement which comprises introducing said reactant and entrained fine particles into said catalyst bed through a foraminous distributor extending from the surface of said catalyst bed into said catalyst bed not more than about one-half the depth of said catalyst bed and having a surface area at least 3 to 5 times the area of the upper surface of said catalyst bed.

spherical reactor which is the base of the spherical segment occupied by the catalyst bed nearer to the vapor inlet of the spherical reactor. Thus, for a spherical reactor having a diameter of 15 feet a catalyst bed 11.25 feet deep having the top thereof 1.875 feet from the top of the sphere, the surface area of the vapor distributing cages must be at least about 232 square feet, i.e., at least about three times the area of the small circle of the sphere which is the upper base of the spherical segment occupied by the catalyst bed. Employing cages made of wire mesh as described hereinafter having an inside diameter of 4 inches and being 2 feet long about 111 such cages are required.

The spherical reactor is supported in any suitable manner as by a plurality of columns of which two, 51 and 52, are shown.

As stated hereinbefore, the spherical reactor can be used for all hydrocarbon conversions taking place at elevated temperatures as, for example, hydrogenation including hydrodesulfurization, reforming, hydrocracking and the like. In general, the method comprises converting reactant vapors under very high pressures of the order of 500 to 2,000 or more pounds per square inch over a granular catalyst which comprises supplying the reactant vapors into a spherical shaped conversion zone capable of withstanding very high pressures with a minimum of required wall thickness through an inlet which delivers said vapors into an inlet plenum space within the confined space, which inlet plenum space is of the shape of a spherical segment of one base. Preferably, said vapors are delivered into said plenum space as a plurality of horizontally directed streams. The vapors flow from said inlet plenum space through a bed of granular catalyst to effect conversion, the bed of granular catalyst being confined and supported in the form of a spherical segment of two bases having a bed depth not greater than about 75 percent of the total spherical zone diameter and the distance from either of the bases of the spherical segment confining the catalyst bed to the adjacent periphery of the spherical zone preferably is not in excess of about 12.5 percent of the diameter of the spherical zone. In addition, the area of the two bases of the spherical segment confining the catalyst bed are at least about 87.5 percent of the area of the great circle of the spherical zone. The vapors flow from the catalyst bed into a catalyst-free collecting space in the shape of a spherical segment. The aforesaid collecting space can be filled with inert pebbles, preferably of graded size as indicated in Figures 1 and 5.

The foregoing limits upon the size of the catalyst bed ensure that the mass velocities of the vapors flowing through the bed shall not vary across the bed at any given plane more than about 10 percent and also ensure against excessive pressure drops across the catalyst bed due to excessive mass velocities which would occur if the catalyst bed extended into the portions of the spherical zone occupied by the inlet plenum space and the gas collecting space.

It is preferred to fill the vapor collecting space with inert material. A suitable material for this purpose is alumina balls or pebbles graded to size topped by a layer of crushed tabular alumina. Thus, the vapor collecting space or the lower spherical segment having one base is filled to about 6 inches below the catalyst bed base with alumina balls or pebbles about ¾ inch in diameter. Upon the ¾ inch balls is placed a layer about 2 inches thick of alumina balls ⅜ inch in diameter. Upon the ⅜ inch balls is placed a layer of ¼ inch diameter alumina balls or pebbles about one inch in depth. Finally there is placed upon the ¼ inch pebbles a three-inch layer of tabular alumina crushed to pass a ¼ inch screen. The dimensions given hereinbefore as to diameters of the various size pebbles and as to the depth of each layer are not critical but are illustrative of a typical distribution of the inert material.

The suspension of the corrosion resistant shell, the vapor baffling and vapor distributing means discussed in conjunction with the spherical reactor can also be used with the same advantages in a cylindrical reactor. Thus, for example, in a cylindrical reactor shown in Figure 5 with enlarged details shown in Figures 6, 7 and 8 a shell 101 of structurally strong material is provided. Within the shell a layer of insulation 102 is placed and within the layer of insulation in spaced relation to the insulation a corrosion resistant metal liner 103 is suspended. Liner 103 is secured to and suspended from vertical annulus 104 in any suitable manner as by welding. Vertical annulus 104 in turn is secured to and suspended from the roof of the reactor in any suitable manner as by welding. As shown the joint between liner 103 and vertical annulus 104 is backed by annulus 106. It is preferred, however, to make vertical annulus 104 of thicker plate and dispense with annulus 106.

An annulus 107 is supported on legs 108 resting on the bottom of the reactor and within the lower end of liner 103 provides a catalyst-tight sliding joint compensating for the expansion and contraction of liner 103.

The cylindrical reactor is provided with a vapor inlet and a vapor outlet. The vapor inlet comprises a cylindrical throat 148, a layer of insulation 109 and an outer shoulder 110 having flange 111 pierced for a plurality of bolts 112. The complementary vapor inlet pipe is provided with flange 113 pierced for bolts 112. At a suitable point a plurality of stays 114 are secured to the inlet piping from which the vapor distributing assembly is suspended.

The vapor distributing assembly comprises a plurality of annuli 115, 116, 117, 118 and 119 concentric with the cylindrical throat 148 of the vapor inlet. The annuli have outside diameters substantially the same as the inside diameter of the cylindrical throat 148 and are secured respectively to cylinders 120, 121, 122, 123 and 124.

The diameters of the cylinders 124, 123, 122, 121 and 130 diminish in that order with the diameter of cylinder 124 being about 70 to about 80 percent of the inside diameter of cylindrical throat 148. Preferably, the diameter of cylinder 123 is about 70 to about 80 percent of the inside diameter of cylinder 124. Preferably collar 122 has a diameter about 65 to about 75 percent of the inside diameter of collar 123 and cylinder 121 has a diameter about 45 to about 55 percent of the inside diameter of cylinder 122. Cylinder 120 preferably has a diameter about 25 to about 35 percent of the inside diameter of cylinder 121. Thus, about 50 percent of the vapors issuing from cylindrical throat 148 enter cylinder 124 the balance passing outside of the cylinder to be deflected by annulus 119 in a horizontal path into plenum chamber 125. About 65 percent of the vapors passing through cylinder 124 enter cylinder 123 the balance passing around cylinder 123 and being deflected in a horizontal path by annulus 118.

Annuli 115, 116, 117, 118 and 119 and the associated cylinders or collars 120, 121, 122, 123 and 124 are mounted on rods 126 and 127 and others not shown and spaced apart a distance slightly less than the length of the attached cylinder or collar. Thus, when the collars are 4 inches high the annuli are spaced 3¼ inches apart.

The reactor is provided with a plurality of vapor distributing means which provides an area of contact between vapors and catalyst bed at least 3 to 5 times the cross-section of the catalyst bed. A suitable vapor distributing means and particle retainer is provided by a plurality of cages 128. As illustrated, the cages 128 comprise a foraminous cylinder preferably of corrosion resistant mesh open at the top and closed at the bottom. The openings in the screen or mesh are the largest which will keep the catalyst particles from entering the cage. The cylinders are of any length less than half the depth of the catalyst bed necessary to produce the required total area of 7. The improvement in claim 6 wherein the foraminous distributor comprises a plurality of foraminous tubes having a total surface area at least 3 to 5 times the area of the upper surface of said catalyst bed and each tube extending from the surface of said catalyst bed into said catalyst bed not more than one-half the depth thereof.

8. The improvement in claim 6 wherein the major portion of the reactant is introduced into the reaction zone as a plurality of streams flowing above and substantially horizontal to the upper surface of said bed of catalyst.

9. An apparatus for the conversion of fluid reactant under very high pressure over a granular catalyst which comprises a spherical reactor shell capable of withstanding very high pressures with a minimum of required wall thickness, means supporting said spherical reactor shell, a first foraminous plate disposed horizontally in said reactor a distance at least about 12 percent of the diameter of said reactor shell from lower end of the vertical diameter thereof, a second foraminous plate disposed horizontally not more than about 12 percent of the diameter of said reactor from the upper end of said vertical diameter, the distance between said first and second foraminous plates being not more than 75 percent of the diameter of said reactor shell, a layer of insulating material secured to the inner surface of said reactor shell, a corrosion resistant liner disposed inwardly and spaced from said insulating layer, a plate secured to the inner surface of said reactor shell above said second foraminous plate, said plate being frusto-conical in shape, a vertical first cylinder secured to said frusto-conical plate and secured to the upper end of said corrosion-resistant liner, a second vertical cylinder secured to the lower end of said corrosion resistant liner, a vertical third cylinder having an outwardly extending flange rigidly mounted on the inner surface of said shell concentric with said diameter of said shell below the lower edge of said second vertical cylinder, a vertical fourth cylinder having an inwardly extending flange slideably mounted on said outwardly extending flange of vertical third cylinder for sliding substantially catalyst-tight contact with said second vertical cylinder, a reactant inlet concentric with said shell diameter and mounted at the upper end thereof, a reaction product outlet concentric with said shell diameter and mounted at the lower end thereof, means mounted at said reactant inlet to introduce the major portion of reactant into the space above said second foraminous plate as a plurality of streams flowing above and substantially parallel with said second foraminous plate, and means located below said first foraminous plate for removing catalyst.

10. In an apparatus for the conversion of fluid reactant in the presence of a static bed of granular catalyst comprising a reactor, a catalyst bed in said reactor, a fluid reactant inlet disposed above and vertically to said catalyst bed and an outlet beneath said catalyst bed for reaction products, the improvement which comprises fluid reactant distributing means vertically spaced above the surface of said catalyst bed, said fluid reactant distributing means comprising a plurality of annuli concentric with said reactant inlet having outside diameters substantially the same as the inside diameter of said reactant inlet, each of said annuli having a vertical cylinder secured to the inner periphery of said annuli; each of said annuli having the vertical axis thereof in the same straight line, and said annuli being rigidly vertically disposed along said straight line with the distance between adjacent said annuli slightly less than the height of the vertical cylinder secured to the lower annuli, the diameter of the uppermost vertical cylinder being slightly less than the inside diameter of said reactant inlet and the diameter of each succeeding vertical cylinder being sufficiently less than the inside diameter of the immediately vertically preceding vertical cylinder so that said vertical cylinder can project into the preceding vertical cylinder and form a narrow annulus between the inside of the preceding vertical cylinder and the outside of said projecting vertical cylinder.

11. The improvement of claim 10 wherein a disk is suspended below the lowest annulus in the plurality of annuli a distance about equal to the height of a vertical cylinder and the disk has an outside diameter substantially equal to that of said annuli.

12. In an apparatus for the conversion of fluid reactant carrying entrained solid particles at least a portion of which pass a 250-mesh screen which comprises a reactor, a static bed of granular catalyst in said reactor, a fluid reactant inlet disposed above and vertically to said bed, and a reaction product outlet disposed below said bed the improvement which comprises a foraminous fluid reactant distributing means pervious at least to particles passing a 250-mesh screen having a total surface of contact with said catalyst bed at least 3 to 5 times the area of the upper surface of said bed and extending into said bed not more than one-half the depth of said bed.

13. The improvement of claim 12 wherein the foraminous fluid reactant distributing means is a plurality of foraminous cylinders closed at the end immersed in the catalyst bed and having a total surface area at least 3 to 5 times the surface area of the upper surface of said static catalyst bed and extending into said catalyst bed not more than one-half the depth of said catalyst bed.

14. In an apparatus for the conversion of fluid reactant carrying solid particles at least a portion of which passes a 250-mesh screen, which comprises a reactor, a static catalyst bed, a fluid reactant inlet disposed above and vertically to said static catalyst bed, and a reaction products outlet disposed below said static catalyst bed, the improvement which comprises a plurality of annuli having outside diameters substantially the same as the inside diameter of said fluid reactant inlet and being disposed vertically downwardly from said fluid reactant inlet and concentric with said fluid reactant inlet, each of said annuli having a vertical collar secured to the inner periphery of said annuli, the height of said collar being slightly greater than the vertical distance between adjacent annuli, the outside diameter of the uppermost collar being slightly less than the inside diameter of said fluid reactant inlet, and the outside diameter of each succeeding lower collar being slightly less than the inside diameter of the preceding collar to provide an annular space between the lower end of said fluid reactant inlet and the upper end of the uppermost collar and between the lower end of each succeeding collar and the upper end of an adjacent lower collar, and a foraminous fluid reactant distributing means immersed in said static catalyst bed not more than one-half the depth of said bed and having a total area of contact with said bed at least 3 to 5 times the area of the upper surface of said static catalyst bed.

15. The improvement of claim 14 wherein a disk is suspended below the lowermost annulus of said fluid reactant distributing means and concentric therewith, said disk having an outside diameter substantially the same as said lowest annulus and said foraminous fluid reactant distributing means comprises a plurality of foraminous cylinders having the end inserted in said catalyst bed closed and having lengths not more than one-half the depth of said catalyst bed.

16. A method of converting reactant under very high pressure over a granular catalyst which comprises establishing a bed of granular catalyst in a reaction zone, said bed of granular catalyst being in the form of a spherical segment of two bases, the sum of the areas of said two bases of said bed of granular catalyst being at least 87.5 percent of the maximum cross-sectional area of said bed and the distance between said two bases being not more than about 75 percent of the diameter of the maximum cross-sectional area of said bed of granular catalyst, to maintain the difference in the mass velocity of the reactant across said bed of granular catalyst at not more than about 10 percent, introducing a major portion of a fluid reactant and entrained solid particles at least a portion of which passes a 250-mesh screen into said reaction zone as a plurality of streams flowing substantially parallel to the upper surface of said bed of granular catalyst, introducing said reactant and entrained particles into said bed of granular catalyst through a foraminous distributor having a surface area at least 3 to 5 times the area of the upper of said two bases of a spherical segment forming said bed of granular catalyst and extending into said bed of granular catalyst not more than half the distance between said two bases of said spherical segment forming said bed of granular catalyst, withdrawing conversion products from substantially the entire area of the lower of said two bases of a spherical segment forming said bed of granular catalyst into a collecting space within said reaction zone, and withdrawing conversion products from said collecting space.

17. An apparatus for the conversion of fluid reactant over a bed of granular catalyst which comprises a reactor, an inlet chamber within said reactor in the upper portion thereof, a vapor collecting chamber within said reactor in the lower portion thereof, a catalyst chamber interposed between said inlet chamber and said vapor collecting chamber, said catalyst chamber being constructed and arranged as a spherical segment having two bases, the sum of the areas of said two bases being at least about 87.5 percent of the area of the great circle of said spherical segment, the distance between said two bases being not more than about 75 percent of the diameter of said great circle of said spherical segment, the upper of said two bases being contiguous to, substantially parallel with, substantially co-extensive with, and in fluid communication with, said inlet chamber, the lower of said two bases being contiguous to, substantially parallel with, substantially co-extensive with, and in fluid communication with, said vapor collecting chamber, inlet means for introducing fluid reactant into a reactant distributing means in said inlet chamber, said reactant distributing means being constructed and arranged to flow fluid reactant over the cross-section of the upper base of said catalyst chamber as a plurality of streams flowing substantially parallel to the upper base of said catalyst chamber foraminous fluid reactant distributing means in fluid communication with said inlet chamber extending downwardly in said catalyst chamber about one-half the distance between said upper and lower bases thereof and having a total surface area at least about 3 to about 5 times the area of the upper surface of a bed of granular catalyst to be confined in said catalyst chamber, and means for withdrawing vapors from said vapor collecting chamber.

References Cited in the file of this patent
UNITED STATES PATENTS

| | | |
|---|---|---|
| 2,339,882 | Savage | Jan. 25, 1944 |
| 2,394,651 | Alther | Feb. 12, 1946 |
| 2,399,560 | Murphree | Apr. 30, 1946 |
| 2,548,875 | Degnen et al. | Apr. 17, 1951 |
| 2,635,989 | Bonner | Apr. 21, 1953 |
| 2,722,501 | Kassel | Nov. 1, 1955 |
| 2,763,699 | Van Dijk et al. | Sept. 18, 1956 |

UNITED STATES PATENT OFFICE
CERTIFICATE OF CORRECTION

Patent No. 2,884,372

April 28, 1959

Eric V. Bergstrom

It is hereby certified that error appears in the printed specification of the above numbered patent requiring correction and that the said Letters Patent should read as corrected below.

Column 8, line 34, claim 2, line 38, claim 3, and line 48, claim 4, for the claim reference numeral "16", each occurrence, read -- 1 --.

Signed and sealed this 17th day of November 1959.

(SEAL)
Attest:

KARL H. AXLINE
Attesting Officer

ROBERT C. WATSON
Commissioner of Patents